Oct. 3, 1950  F. A. TEIGEN  2,524,182
METHOD FOR PROCESSING POTATOES
Filed Sept. 28, 1945  6 Sheets-Sheet 2

INVENTOR.
FERDINAND A. TEIGEN
BY
*P. A. Whiteley*
ATTORNEY

Oct. 3, 1950          F. A. TEIGEN          2,524,182

METHOD FOR PROCESSING POTATOES

Filed Sept. 28, 1945          6 Sheets-Sheet 4

INVENTOR.
FERDINAND A. TEIGEN
BY
W. A. Whiteley
ATTORNEY

Patented Oct. 3, 1950

2,524,182

UNITED STATES PATENT OFFICE 2,524,182

METHOD FOR PROCESSING POTATOES

Ferdinand A. Teigen, Minneapolis, Minn., assignor to United States Air Conditioning Corporation, Minneapolis, Minn., a corporation of Delaware Application September 28, 1945, Serial No. 619,069

8 Claims. (Cl. 99—103)

My invention relates to a method and apparatus for processing potatoes. The purpose of the invention is to clean potatoes in very large volume, and to effect a cleaning action which not only removes adherent clay, soil and the like, but excrescencies and scabby matter, and which also destroys adherent bacteria and spores, all without subjecting the potatoes moved through the apparatus and subject to the method in very large masses from any bruising or abrading action, which can result in injury thereto.

As is well known, potatoes now throughout the world constitute a major source of human food. It is a bulky food which must be consumed during the season succeeding its growth and which is subject to rapid deterioration, and, in cases where the potatoes become infected, to spoilage. Potatoes are grown in a small way quite generally, but certain heavy growing potato sections furnish a large part of the potatoes consumed throughout the country, and they must be shipped to a very large part of different sections of the country. It has been found that such potatoes should be properly processed by cleaning and destruction of bacteria before being put in 100 pound sacks and shipped, as the saving in spoilage more than offsets the cost of such processing.

Spoilage also may be induced in potatoes by any kind of rough handling which crushes the fibres of the potato body or breaks the outer skin. A grave difficulty has been encountered in processing operations, because heretofore no effective means has been developed in the handling of large volumes of potatoes and in processing them which avoids bruising and other damage to a very considerable number of the potatoes. For it must be borne in mind that, in processing potatoes for cleaning, sterilizing and sacking, very large masses, in both volume and weight of potatoes, have to be handled at a relatively rapid rate to keep costs down, which may be incurred in waste of water, chemicals, power and the like, if the potatoes are processed in relatively small quantities.

Difficulties that have been encountered in the processing of potatoes may be classified as follows:

First, and perhaps most important, no method or apparatus has been devised to carry on a continuous processing operation on large volumes of potatoes wherein there is complete avoidance of rolling, dropping, cascading or otherwise precipitating the potatoes in such manner as to cause a certain amount of bruising and skin damage. Such injury to the potatoes themselves is accentuated by the fact that in the processing operations it is impossible to maintain a constant flow in constant volume of potatoes through any apparatus and in connection with any known method of processing.

The reasons for this are that the potatoes are received more or less irregularly at the point of processing and are finally fed to the processing apparatus as received, and there is fluctuation of manpower for handling the potatoes. Thus an amount of manpower for handling a minimum flow of potatoes might be entirely inadequate to handle a maximum flow and whatever manpower is available may be depleted from time to time for various causes so that the delivery of potatoes to the processing apparatus may quite suddenly fall off below the maximum or with equal suddenness rise to the maximum, with the result that there is a more or less constant fluctuation of the actual volume of potatoes and hence of the upper level of potatoes in the processing apparatus.

This fluctuation is caused by the rate of delivery of potatoes by an initial conveyor which necessarily has to move with a considerable degree of speed and a processing conveyor which carries deep masses of potatoes at relatively slow speed.

If the initial or feeding conveyor is kept fully loaded, the level of the potatoes in the processing chute may be maintained at substantially a maximum. But where the rate of delivery of the potatoes to the initial or feed conveyor drops off, the level above the processing conveyor falls in the processing trough, with the result that potatoes which might be delivered without any substantial drop at the maximum rate of delivery are cascaded over a very considerable distance of drop at the slower rate of delivery, resulting in extensive bruising and skin damage.

Another difficulty which has proved serious, particularly in very greatly increasing the expense of processing, has come from a large wastage of water used in both initial processing and in final washing.

While water itself may be regarded an inexpensive, the power required to move the quantities of water required in substantially any processing method and apparatus is large in proportion to the volume of water moved, and if that volume is many times more than is needed for an effective processing operation the consumption of power is that much greater and the cost of processing is correspondingly increased.

The final washing of the potatoes both to remove chemicals used in the processing and to effect final cleaning of the potato skins should be as nearly as possible with pure water and absolutely necessarily with water free from living bacteria or spores. The conservation, recovery, and regeneration of this pure water will aid greatly in not only reducing the cost of the processing operation, but also in giving more completely cleaned and sterilized potatoes to go into the sacks. To conserve this pure water which may be recovered and used over is a highly desirable function of an effective, and not too costly method of processing.

Another difficulty which has been encountered in potato processing methods heretofore employed, has been the waste of chemicals used for both loosening adherent matter such as scabby material on the potatoes and in sterilizing the potato skin itself. Such chemicals must be employed, frequently two or more of such chemicals where mixture thereof is a matter to be so far as possible avoided. In the practice of potato processing methods heretofore known, saving or reduction of waste of such chemicals has not been effectively accomplished.

I have discovered that a highly effective way to prevent bruises or skin contusions of potatoes being processed is to provide a processing trough having a continuously slow-moving transfer belt along its bottom and to deliver the potatoes to the front of said trough by a belt moving many times more rapidly than the first mentioned belt and to maintain the delivery plane of the delivery belt at substantially the level across the main processing belt which has been reached by potatoes always on that belt. Further, to provide means controlled by the fluctuating level of potatoes in the trough as the same are moved therealong by the processing belt which will raise and lower the delivery end of the delivery belt so as to maintain the delivery of potatoes into the processing trough at whatever level the potatoes therein may reach at any given time. This means in effect that the potatoes shall be delivered to the processing trough so as always to receive contact support from the masses of potatoes themselves. That is, that, whether the level be high or low, the potatoes, delivered at a rapid rate upon the processing conveyor are there constantly kept in bodily contact, never dumped or precipitated from one level to a lower level.

Since the feed of potatoes from the rapidly moving delivery conveyor depends upon the volume of potatoes fed to this conveyor, and since the volume will from time to time vary from maximum to none at all, it necessarily follows that there may be periods when little or no potatoes are being fed. At such times, as the main conveyor forwards the potatoes they might, unless means is provided to prevent it, lose support to the rear.

This would mean in the end, if the failure of feeding and flow of potatoes continued, that an upwardly extending pile of potatoes would slope downwardly from the high area of the pile substantially to the main conveyor. The angle of this slope will vary under different conditions. For example, round potatoes will build up to a less angle from the horizontal than elongated or flat potatoes.

But a time may come when something may occur to start the potatoes held in such a slope to flowing down the slope. This may occur from the slipping of a single potato or some other cause so that a regular avalanche or cascade of potatoes would roll down the slope, whatever its angle. Such a cascade would necessarily cause impacts which must result in serious damage to considerable numbers of the potatoes.

To meet this situation I have discovered that if means can be provided to keep moving the potatoes in the trough backwardly as they are forwarded by the supporting conveyor, while the depth of the layer of potatoes will be reduced, lateral supporting contact will be maintained.

I provide such means by mounting upon the frame which carries the feeding conveyor a roller of substantial weight in itself which normally will rest by its weight alone upon the potatoes and at other times may have that weight reinforced by some part of the weight of the feeding conveyor frame. The effect of this is that when the level starts to fall the potatoes will be continuously pressed backward so as to maintain at all times supporting contact.

I have also discovered that the potatoes, when reaching the processing trough, should immediately be subjected to a heavy water spray and kept subject to said spray for some considerable distance of their travel along the trough, to lubricate the potatoes so they will readily adjust themselves to facilitate formation and progressive movement of the mass, and incidentally to remove adherent soil, clay and the like, thereby to reduce the amount of chemicals consumed, and that the water so sprayed should gravitate into a large tank through which the conveyor chains and support members will be caused to pass throughout the length of the trough, the water so first sprayed to be withdrawn from said tank below the point of spraying to take with it the major part of heavy dirt, soil, clay and the like, which is adherent to and brought up in the mass of potatoes directly by the delivery conveyor.

I have further discovered that if a disinfecting and detergent chemical, such as sodium hypochlorite, is employed, and which has a normal corrosive effect upon the metal of the conveyor chains, and be followed immediately in the longitudinal movement of the potatoes through the trough by a spray of a reacting chemical, such as sodium sulphite, which will immediately neutralize the corrosive action of the sodium hypochlorite, such corrosion can be rendered of no serious importance.

I have further discovered that in the use of these chemicals, specially constructed tank members or receptacles immediately below the respective sprays should be provided to receive the chemical after it drains through the masses of potatoes on the processing belt. This receptacle also should have special pump means to carry the chemicals away for regeneration and reuse. The receptacle for the sodium hypochlorite should be lined by some material which is not affected or corroded by that chemical, such as rubber or certain types of plastic.

I have further discovered that if a narrow band of jets across the processing trough at the discharge end delivers pure water through the potatoes and into the tank and if a pump is applied to the tank substantially below said delivery of pure water, the water may be recovered and used over and over again.

I have discovered also that it is necessary to control the delivery of potatoes from the end of the processing trough. This is required because the potatoes at their maximum depth may be piled up in a mass to a thickness of some six feet, and if no control were exercised over their discharge they would tend to roll down the heap with such speed that bruising and contusions might result.

I have discovered that if a gate is angularly disposed so that when pushed open for normal discharge of the potatoes it will take about the normal angle of movement from a pile, and if such gate is counterbalanced by spring means so as to be moved easily by the pressure of the oncoming masses of potatoes, the contact of the walls of the potatoes with the face of the gate and with one another will easily lift the gate a sufficient amount and at the same time restrain any rolling action of the potatoes to maintain one of the essential purposes of this invention of having potatoes at all times given lateral support by continuous contact below and along their sides with other potatoes.

It is a principal object of my invention to provide a method of processing potatoes for cleaning, sterilizing and sacking, which consists in causing delivery of potatoes upon a rapidly moving conveyor, thereafter slowly moving the potatoes so delivered in a continuous mass which has a variable depth determined by the rate of delivery thereto, varying the vertical position of the line of delivery of the rapidly-moving conveyor so that said delivery will always be directly to the top of the mass, and hence that the potatoes will always be maintained in bodily contact to prevent injury of the potatoes through contusions and bruising caused from cascading or dropping the potatoes.

It is a further object of my invention to provide means such as a roller of substantial weight held so that said roller will ride upon the mass of potatoes in the trough near its rear end, and by its weight upon potatoes of the mass will exert a constant pressure such that the incoming potatoes will be moved to establish and maintain the aforesaid continuous mass and will tend to constantly push the potatoes backwardly in reverse direction to the continuous flow of potatoes through the machine, and thus will maintain them in lateral contact, even if delivery of potatoes from the delivery conveyor is entirely stopped.

It is a further object of my invention to control the line of delivery of the rapidly-moving conveyor by the varying depths of the mass of potatoes being processed. To that end it is an important object of my invention to provide a delivery conveyor adapted to be run at considerable speed and which is pivoted at its rear end and which has means for lifting or lowering the line of delivery of potatoes from the conveyor, said lifting and lowering means being automatically controlled through electric circuits and motors by the varying depths of the mass of potatoes which are being moved and processed.

It is a further object of my invention to continue the control of the mass of potatoes throughout its length and after delivery from said mass to other instrumentalities, such as rinsing or washing means, so that at all times the individual potatoes making up the mass will be contacted at the sides, ends and to degree at the bottom by other potatoes making up the mass, and thus to prevent any dropping or cascading of the potatoes which might cause bruising, contusions or other injuries.

It is a further object of my invention in furtherance of the above stated end to arrange a gate at the discharging end of the mass of potatoes which will by gravity tend to take an angular position about that of discharge of the potatoes from the moving mass thereof, and which gate will be held by some means such as springs so that it may contact the discharging potatoes but with very little weight, and hence so it will readily be caused by the advancing mass to swing on its pivot to permit the potatoes to be discharged from the main mass without dropping or cascading.

It is a further object of my invention to provide motors for lifting and lowering the hinged delivery conveyor and to arrange a hinged baffle plate having thereon a switch which will be swung outwardly more or less according to the volume of delivery of potatoes coming into the front of the processing trough, and which, when swung a predetermined distance, will operate the switch to close the circuit to the motor for lifting the free end of the conveyor to keep it in alignment along its delivery end with the top of the mass of potatoes in the trough at the point of delivery and thus to insure that the potatoes being delivered continuously contact the potatoes in the mass being processed and that there is no injurious dropping, cascading or movement of the potatoes while being delivered to the mass moved along the trough to be processed.

It is a further object of my invention to subject the slow-moving mass of potatoes from the moment they are delivered by the rapidly moving conveyor to a heavy and quite widespread spray of water and to provide a tank under the water for receiving said spray and to provide means for withdrawing the water from said tank and accumulating it in a settling tank for re-use, whereby the greater part of rough dirt, clay, and the like on the potatoes will be removed therefrom during the early part of their movement in the continuous stream thereof.

It is a further object of my invention, after the above-noted preliminary cleaning action, to subject the potatoes to a spray of a strong sterilizing solution, such as sodium hypochlorite, and to accumulate the sodium hypochlorite in a tank separated from the water-receiving tank and to withdraw it and to clean or regenerate it for re-circulation and continued use.

It is a further object of my invention to subject the potatoes and the metal parts of the slow-moving conveyor to a spray of sodium sulphite or other neutralizing agent immediately after the application of the sodium hypochlorite to the potatoes has been made, and thereafter to accumulate the sodium sulphite in a tank independent from the water-receiving tank and the sodium hypochlorite tank, and to pump the solution away from said sodium sulphite tank for regeneration and re-use. This is for the purpose of not only neutralizing the sodium hypochlorite on the surface of the potatoes, but more important is for the purpose of neutralizing the sodium hypochlorite on the metal parts of the conveyor and doing it so quickly after the contact has been made as to substantially eliminate corrosion of such metal parts.

It is a further object of my invention to subject the slow-moving mass of potatoes after they have been treated by the sodium sulphite to a concentrated spray of pure water, purified by distillation or other means, and to recover this water for reuse, and thereby to reduce water consumption and sewage disposal.

The full objects and advantages of my invention will appear in the general and detailed description hereinafter given in the specification, and the novel features of my invention by which the above noted advantageous results are obtained will be particularly pointed out in the claims.

In the drawings illustrating an application of my invention in one of its forms.

Figure 1:
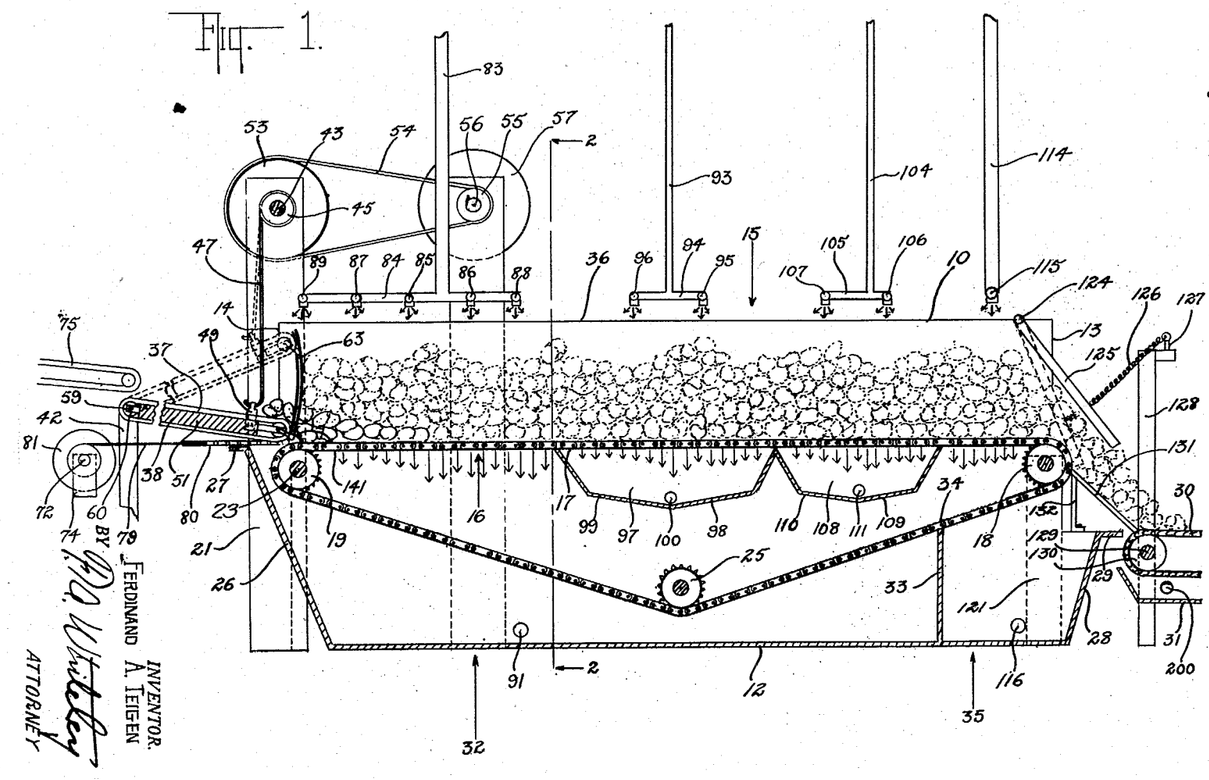
Fig. 1 is a sectional partly schematic longitudinal view of the apparatus for carrying out my method, taken inside the nearer trough wall with some parts not shown.
Figure 2:
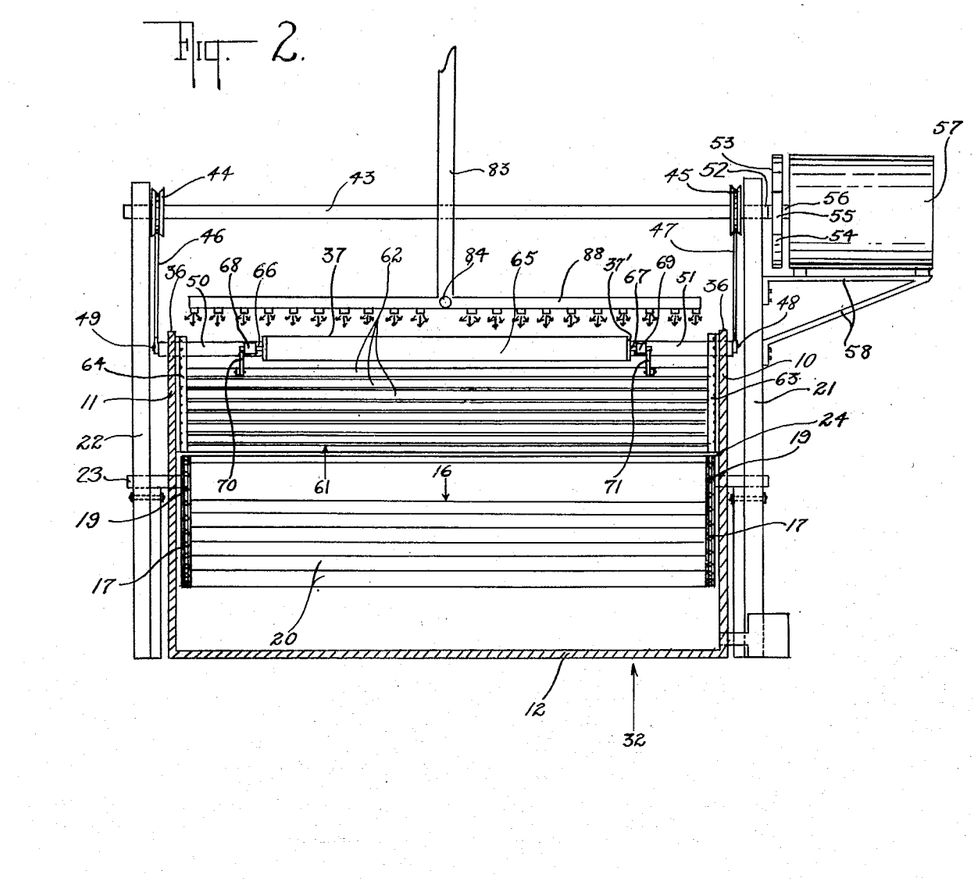
Fig. 2 is a transverse sectional view taken on line 2—2 of Fig. 1, with some parts omitted.

As illustrated, having reference to Figs. 1 and 2, side walls 10 and 11 are united with a bottom wall 12 which is at ground level. The respective ends 13 and 14 of the side walls 10 and 11 terminate at the points 13 and 14 along their upper part and form together a trough member indicated by the numeral 15, which has at its bottom an endless conveyor 16, Figs. 1 and 2, operated in a well known way by endless chains 17 which run over sprockets 18 and 19. This endless conveyor may be made up of a series of slats 20 secured to the endless chain and will be supported by under-struts of suitable shape and sufficient strength, not shown.

Side frame members 21 and 22 extend vertically on each side of the side members 10 and 11 and form a support for the rear sprocket wheels 19 and for the means for lifting and lowering the initial high speed delivery conveyor, which means in turn supports the front end of such conveyor as will be pointed out in detail hereafter. The sprockets 19 are driven upon a shaft 23 by any suitable source of power, not shown, through the drive of the conveyor 16 and at a slow rate of travel of say six inches of longitudinal travel per minute.

The side walls 10 and 11 are continued below the level at 24 of the top run of the conveyor 17. And the conveyor is carried down into the space below its top run and under a roller 25 within that space, as shown in Fig. 1. To the side walls 10 and 11 and the bottom wall 12 is secured a rear end wall 26 which slopes from the bottom wall 12 to a horizontal ledge 27 on the top of it in the plane of the top run of the main conveyor 16.

To the lower portions of the rear edges 13 of side walls and other bottom member 12 is secured a front wall 28, Fig. 1, which has an outwardly extending horizontal flange 29 whose top is in the plane of the top of a conveyor belt 30 which leads to or forms a part of a washer overlying a tank 31 and which comprises the final washing apparatus, not shown or claimed herein.

There thus is formed an open-topped tank designated generally by the numeral 32 which underlies the whole extent of the top run of conveyor 16. This tank is adapted to receive water from water sprays later to be defined, one being of recirculated water used for the initial washing action and the other of clean water used for the final cleansing and rinsing. Preferably a transverse partition 33 having its top 34 in the plane of the top of flange 29 will be run across the tank 32 to provide a front supplemental tank 35 which receives run-off of the clean water spray.

As heretofore stated, an open-ended trough is formed which is comprised of the side walls 10 and 11 and the top run of conveyor 16. This trough may be of desired dimensions but in practice would be from six to ten feet wide, around six feet high and may be around sixty feet long. Potatoes would never be loaded clear to the top but by means of the mechanism described herein would reach a maximum height of around one foot below the top edges 36 of the side walls 10 and 11. Moreover, as clearly indicated in Fig. 1, the level of potatoes on the slow-moving conveyor will seldom be maintained constant, but will rise and fall according to the rate of feed of potatoes into the trough.

Figure 3:
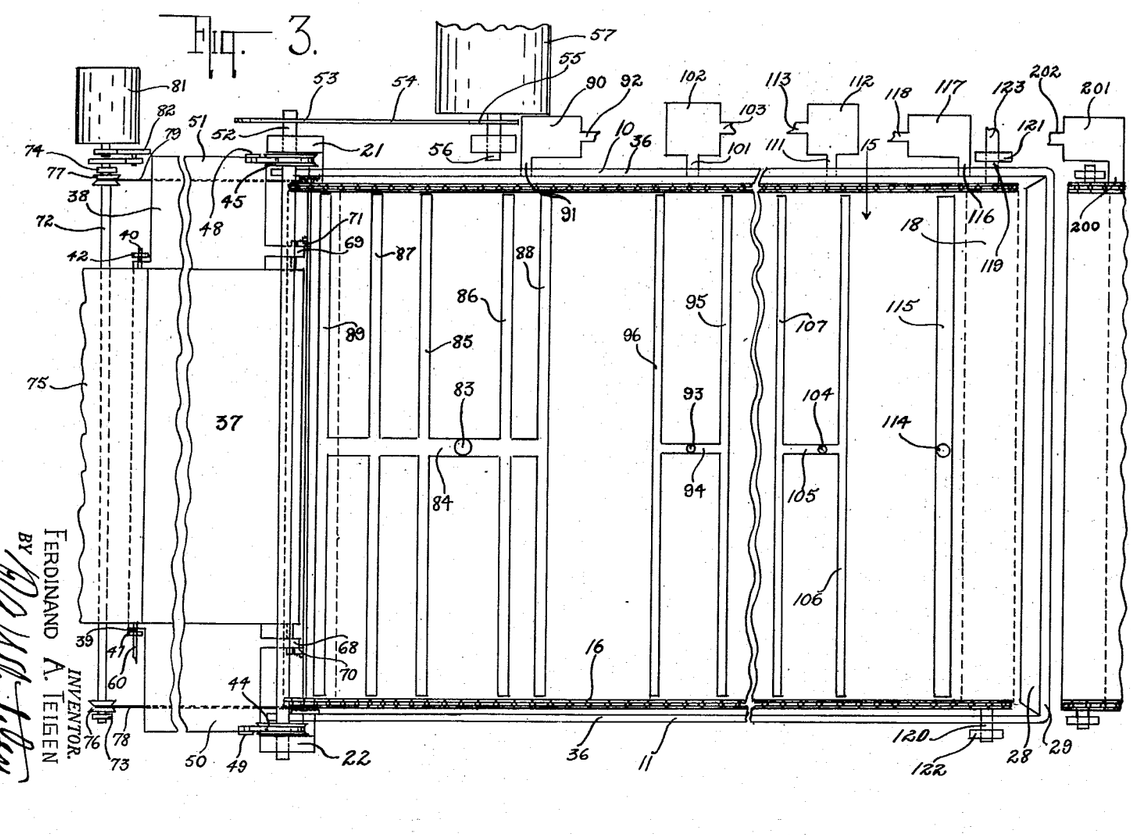
Fig. 3 is a top plan view principally directed to the showing of the spray system and of the ends of the apparatus, with some parts omitted.

To feed the potatoes into the trough 15 a feed conveyor 37 is carried upon a transverse frame member 38, Fig. 3, which has formed thereon pivoting trunnions 39 and 40, that are journaled in bearings in the top of supporting posts 41 and 42. The entire framework of this feed conveyor, the conveyor itself and all parts connected with the framework, therefore are mounted for swinging oscillation on the pivots 39 and 40.

Journaled in the ends of the uprights 21 and 22, Fig. 2, is a transverse shaft 43 which carries adjacent its ends windlass pulleys 44 and 45, cables 46 and 47 are secured to the windlass pulleys 44 and 45 respectively and are connected with bracket members 48 and 49 fast on lateral extensions 50 and 51 of the frame 38. The front end of the conveyor and its frame and the parts connected therewith is thus suspended from and supported by the cables 46 and 47, and windlass pulleys 44 and 45.

The shaft 43 has an extension 52 on which is a pulley 53. A drive belt 54, Figs. 1 and 3, is connected with a pulley 55 on a motor shaft 56 operated by an electric motor 57 which is supported by bracket arms 58 bolted to the upright 21. The drive parts are so related in size that the windlass pulleys are rotated at very slow speed.

When, therefore, the motor 57 is energized by closing an electric circuit, it will operate to turn the shaft 43 and the windlass pulleys thereon and lift the frame 38 and with it the feed conveyor 37, swinging it on the pivots of trunnions 39 and 40.

The trunnions 39 and 40 are fast on a roller 59, Fig. 1, which supports the rear end of the conveyor belt 37, and the trunnion 39 is extended into a shaft 60 (shown broken off in Fig. 4) which extends to suitable well known driving means (not shown), so geared up as to drive the roller 59 at a relatively high speed so that the feed conveyor 37 is moved very rapidly relative to the processing conveyor 17.

The feed conveyor 37 is considerably narrower than the width of the trough 15, since the potatoes delivered to the trough and upon conveyor 16 may there normally move outwardly from gravity action to the side walls 10 and 11.

Since the trough 15 is normally open at its rear end, as indicated by the rear vertical edge portions 14 thereof, and since the feed conveyor 37 oscillates on its axis at the trunnions 39 and 40, it is necessary to provide a movable vertical wall to hold back the potatoes as the conveyor 37 moves from its lowered full line position of Fig. 1 to its elevated dotted line position. Such a vertical wall may be formed in any desired way, but I have found that a practical form of such wall, designated generally as 61, Fig. 2, may be made up of a number of transverse slats 62 pivotally connected together along their edges and having their ends mounted to move in arcuate guides 63 and 64 bolted to the side walls 10 and 11. The ends of the slats 62 go in these guides.

As shown in Fig. 2, the front end 65 of feed conveyor 37 embodies a roller 37' which has trunnions 66 and 67 journaled in brackets 68 and 69 fast on the frame extensions 50 and 51. Links 70 and 71, as shown in Fig. 2, are pivotally connected to the upper end of the flexible wall 61. By this means the flexible front wall is drawn up and down with the conveyor 37 and connected frame parts, the pivoted link connections 70 and 71 permitting the conveyor to follow the arcuate course of the guides 63 and 64.

Figure 4:
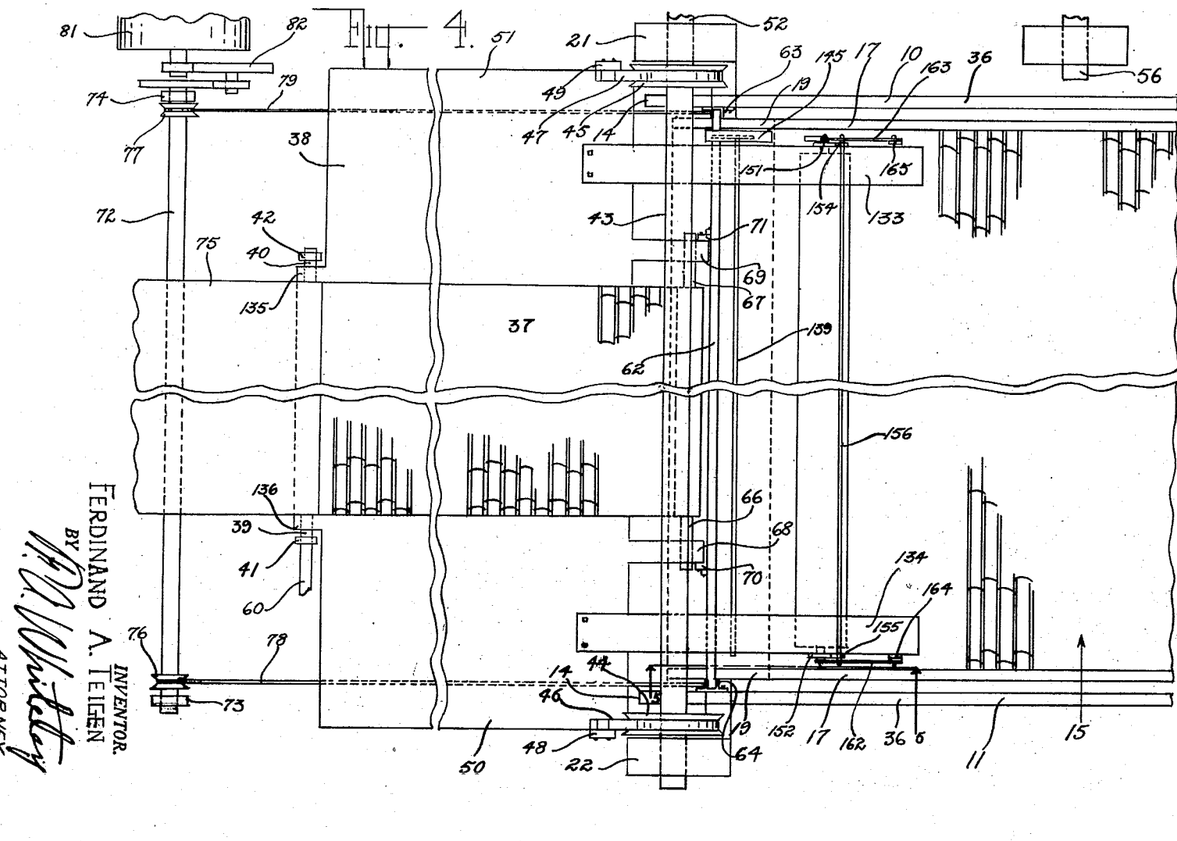
Fig. 4 is an enlarged top plan view of the rear end of the apparatus with the spray pipes omitted.

As shown in Figures 1, 3 and 4, a shaft 72 is journaled in uprights 73 and 74 at the rear of feed conveyor 37 and underneath a conveyor 75 which leads to the outer end of feed conveyor 37. This shaft has thereon pulleys 76 and 77 to which are secured cables 78 and 79 which connect to the rear slat 80, Fig. 1, of the flexible wall 61. A motor 81 is connected by reduction gearing 82 with the shaft 72 and operates to draw the flexible gate 61 backward along with the frame and the feed conveyor 37 against the pressure of any potatoes upon the gate. By these means the gate can be lowered after it has been raised, controlled by circuit-making means hereinafter to be described.

Means for treating the potatoes as they are moved along the trough 15 are shown in Figs. 1, 2 and 3. First there is the means for spraying considerable quantities of water on the potatoes over an extensive area at the rear end of the processing trough 15. This comprises a main feed pipe 83 which is united with a header 84. The header 84 in turn is united with a series of transverse pipes 85, 86, 87, 88 and 89 which extend entirely across the top of the processing trough 15.

These pipes are formed on their under sides with spray nozzles, as clearly shown in Figs. 1 and 3, and by pumping means (not shown) and other pumping means indicated schematically at 90, Fig. 3, water under sufficient pressure is forced in a strong spray over the tops of the potatoes, the first line of spray 89 discharging upon the potatoes as they come from the end of the delivery conveyor 37.

This water gravitates through the potatoes carrying with it the accumulations of dirt, soil, etc., which are brought up upon and with the potatoes, and washes it through the conveyor 16 into the main part of the tank 32. The pump 90 draws the dirt-laden spray water through an opening 91 in the side wall 11, Fig. 1, and through a discharge pipe 92 the spray water and dirt therein is carried to a settling tank (not shown) where it is allowed to remain until the heavier dirt settles out of it and from which the spray water may in turn be drawn for subsequent use.

As clearly indicated in Fig. 3, the area of potatoes subjected to this first spraying action is quite considerable. Ordinarily a practical development may extend this area to over one-fourth of the length of travel of the conveyor belt 16, and in that long travel, subject to the flow of water over the potatoes, substantially all the dirt and soil carried by the potatoes will be removed and the potato skins, largely freed from excrescencies, such as scabs and the like, will be fully exposed to subsequent action.

This subsequent action consists in subjecting the slowly moving mass of potatoes to a spray of some type of sterilizer. In practice it is found that sodium hypochlorite is a very effective agent to destroy bacteria and spores and to loosen and to tend to remove excrescencies on the potatoes.

Accordingly I have provided a delivery pipe 93, manifold 94 and spray pipes 95 and 96 formed with suitable downwardly turned nozzles for projecting a belt of hypochlorite spray across the slow-moving mass of potatoes, as clearly shown in Figs. 1 and 3. The pipes may be made of glass tubing or other plastic material to resist corrosion of the sodium hypochlorite.

Below the area through which the sodium hypochlorite passes is a tank 97, Fig. 1. This tank at its ends seals into the trough walls 10 and 11 and slopes at its bottom, as indicated at 98 and 99, Fig. 1. From an opening 100 extending through wall 10, a pipe 101, Fig. 3, leads to a pump 102 which has its outlet pipe 103 connected with the delivery pipe 93, or with any intervening cleaning and regenerating means, not shown.

In general the sodium hypochlorite, or other sterilizing liquid, will by these means be pumped in a circuit to the spray nozzles, thence through the masses of potatoes into tank 97 and from tank 97 back, as above noted.

Since sodium hypochlorite is corrosive to metal parts, I make use of an immediate succeeding spray of some neutralizing agent, such as sodium sulphite, to prevent such corrosion. This is delivered through a feed pipe 104 to a manifold 105 and spray pipes 106 and 107. A separate tank 108, Fig. 1, similar to tank 97, underlies the area of the moving mass of potatoes beneath the spray from pipes 106 and 107 and is provided with sloping walls 109 and 110 and with an opening 111 through the trough side 10.

A pump 112, Fig. 3, is connected with opening 111 and to discharge pipe 113 and is adapted to be connected with feed pipe 104, either directly or after the sodium sulphite has passed through cleaning and regenerating means, not shown.

The action of the sodium sulphite is to neutralize the sodium hypochlorite and render it non-corrosive. After it has accomplished this result the potatoes will be subjected to a heavy transverse spray of substantially pure water, which by its pressure and by its acting to freshly lubricate the potatoes aids in re-forming the mass into a through disintegrating stream.

This water is delivered from a feed 114 directly to a transverse spray pipe 115. This spray is located at the extreme front of the processing trough and will deliver the water with considerable speed and in quite large volume along the line of spray pipe 115 and upon the front end of the moving mass of potatoes.

The water will flow rapidly through this mass of potatoes, also about and over all parts of their skins as they are being moved under the spray for some considerable period of time and will ultimately gravitate into the tank 35. The pure water is originally delivered to the washing apparatus and collects in tank 31. From there through pipe 200, pump 201 and pipe 202 it is delivered to the pipe 114 and the sprays 115. It accumulates in tank 35 and is drawn from there through pipe 116, pump 117 and delivered by pipe 118 to join with inlet pipe 91 to pipe 83 to be delivered through the initial spray members 85, 86, 87, 88 and 89.

At the front of the processing trough is the front roller 18' of processing conveyor belt 16. This roller which carries the sprockets 18 for driving the large processing conveyor belt, Fig. 3, has trunnions 119 and 120 which extend through the side walls 10 and 11 and are journaled in uprights 121 and 122. The trunnion 119 is extended, as indicated at 123, and is operated from a suitable source of power by standard driving means, not shown.

Mounted upon a shaft 124 which, as shown in Fig. 1, is positioned somewhat inwardly from the ends 13 of the trough walls 10 and 11, and is journaled in the upper edges 36 of said trough walls, is a gate 125. This gate extends from side wall 10 to side wall 11 and is positioned relative to the roller 18' and the conveyor 16 going over it, so that it will fall into an angle somewhat closer to the vertical than the angle of normal flow of potatoes by gravity from the mass as the potatoes are moved to the end of the conveyor 16.

The gate 125 being necessarily of a very strong construction, would normally rest by gravity quite heavily upon the front end of conveyor 16 as it goes over roller 18'. This would be undesirable and would put too much pressure upon the potatoes to open the gate. For this reason a series of springs 126 are secured to a cross bar 127 supported by posts 128 which also form the support for the shaft 129 of roller 130 for operating the washing belt 30.

The force exerted by these springs to lift the gate 125 almost, but not quite, to counterbalance the swinging weight of gate 125, so that substantially no pressure at all is required to swing the gate from the dotted line position to the full line position, as shown in Fig. 1. On that full line position the potatoes gravitate in a continuous stream of the mass in the processing trough to and upon conveyor 30 as shown in Fig. 1. At all times these potatoes have lateral and underneath support so that there will be no dropping or cascading. A deflector or sloping runway 131, supported by members 132, restrains the potatoes from backing up under the return portion of the processing conveyor 16, and guides them onto the conveyor 30.

To the lateral extensions 50 and 51 of the frame 38 are secured a pair of forwardly extending arms 133 and 134, as shown in Fig. 4. These arms are rigidly secured to the frame extensions and are adapted to move up and down with these frame extensions 50, 51 and with the feed conveyor 37, which rock on the point of pivoting of said frame at its rear end on the supports 41, 42, as shown at 135 and 136 of Fig. 4. Pivotally connected in keepers 137 on the under side of frame extensions 133 and 134 is a shaft 138, Figs. 5 and 6, which carries a downwardly depending swinging plate 139 preferably having a lower weighted portion 140. In its normal vertical position, the swinging plate 139 is spaced from a deflector 141 suspended from the front of the frame members 50 and 51 to form a space or throat 143.

The space 143 between the plate 139 and deflector 141 provides a feed throat through which the potatoes from said conveyor 37 must pass. It follows that as potatoes are fed from the end of conveyor 37 they will push the plate 139 outwardly and swing it on the axis of the shaft 138. Upon the end of shaft 138 is rigidly mounted a rod 144 which has rigidly attached thereto a mercury switch 145. At the respective ends of the mercury switch 145 are contacts 146 and 147, the purpose of which will be hereinafter given.

It is in this throat, which may be regarded as a movement-controlling valve for the potatoes, that the potatoes delivered from the rapidly moving delivery conveyor are caused to diffuse, disperse and flow to provide on the processing conveyor a mass of potatoes held in contiguous and contacting formation. And I have provided means operative upon the potatoes after they leave the aforesaid throat to aid in the formation of this mass, wherein the potatoes have underneath and lateral contact support while moved on the processing conveyor to be acted on in the various processing steps by the processing devices comprising the whole apparatus. These means are shown on an enlarged scale in Fig. 5 and in connection with a wiring diagram on a smaller scale in Fig. 6.

The essential feature of such means is the subjecting of the potatoes as soon as they pass through the throat 143 to a considerable degree of pressure. At that time the potatoes are thoroughly soaked with water from the sprays 89 immediately above the point of delivery to the processing trough and they continue to be soaked by other sprays from 87, 85, 86 and 88. This wetting in a sense lubricates the outer surface of the potatoes so that they can readily be caused to flow under or by reason of the force exerted upon them by the aforesaid pressure applied to them.

Various means of exerting such pressure might be used, such for example as a very high degree of water pressure upon them, or by pressure induced from powerful blasts of air. But a preferred form of pressure device comes from the action of a roller 156, the mounting and action of which will now be described.

An arrangement of switches and circuits (later to be described) will raise and lower the feed conveyor 37 in response to feed of potatoes from capacity feed down to complete cessation of feed, and with it will raise and lower the forwardly extended arms 133 and 134. The above-noted pressure means is required in addition to the raising and lowering means. It is required and is absolutely essential to aid in forming the mass of potatoes for movement along the processing trough so as to prevent angular walls of piles of potatoes down which they can cascade and cause injury to at least some of them.

A preferred form of applying this pressure is by the use of a weighted roller 156. To support this roller I secure to the respective frame extensions 133 and 134 a pair of hanger arms 151 and 152. Each of these arms is the same in its details and they are shown in top plan in Fig. 3 and in side elevation in Figs. 5 and 6.

Toward the lower limit of each of these arms is a slot 153 and opposite each of the pair of slots thus, Fig. 4, is an extension 154 on hanger arm 151 and an extension 155 on hanger arm 152. The roller 156, Fig. 5, has supporting trunnions 157 extending through the slot 153 and these trunnions are pivotally connected with arms 158 which in turn are pivotally connected at 159 to the respective extensions 154 and 155.

Stands 160 are secured to the frame extensions 133, 134 and have pivotally mounted therein a shaft 161. Fast on the shaft 161 are a pair of outwardly extending arms 162 and 163, Fig. 4. Links 164 and 165 connect the arms 162 and 163 with extensions of the arms 158.

With this arrangement it follows that as the roller 156 rides upon and presses down with its full weight on the mass of potatoes in the processing trough, the roller may rise and fall within the slots 153, normally floating in a neutral position about at the longitudinal mid-portions of said slots. As it rises and falls while resting upon the mass, the roller will transmit uniformly its full pressure upon the potatoes and also its rise and fall will be transmitted to the arms 162 and 163, the purpose of which will be hereinafter given.

The link 164 connects the arm 162 with a portion 166 which extends outwardly from arm 158 beyond the pivot point 159. An extension upon shaft 161 of arm 162 has thereon a head plate 167. On this head plate is mounted a mercury switch 168 and an entirely separate mercury switch 169. A contact 170, Fig. 6, of switch 168 connects with wires 149 and 171 and a contact 172 of switch 169 connects with an extension wire 173 from switch 168 and with the wire 150. The manner of operation and purpose of these switches will be given hereinafter.

Figure 5:
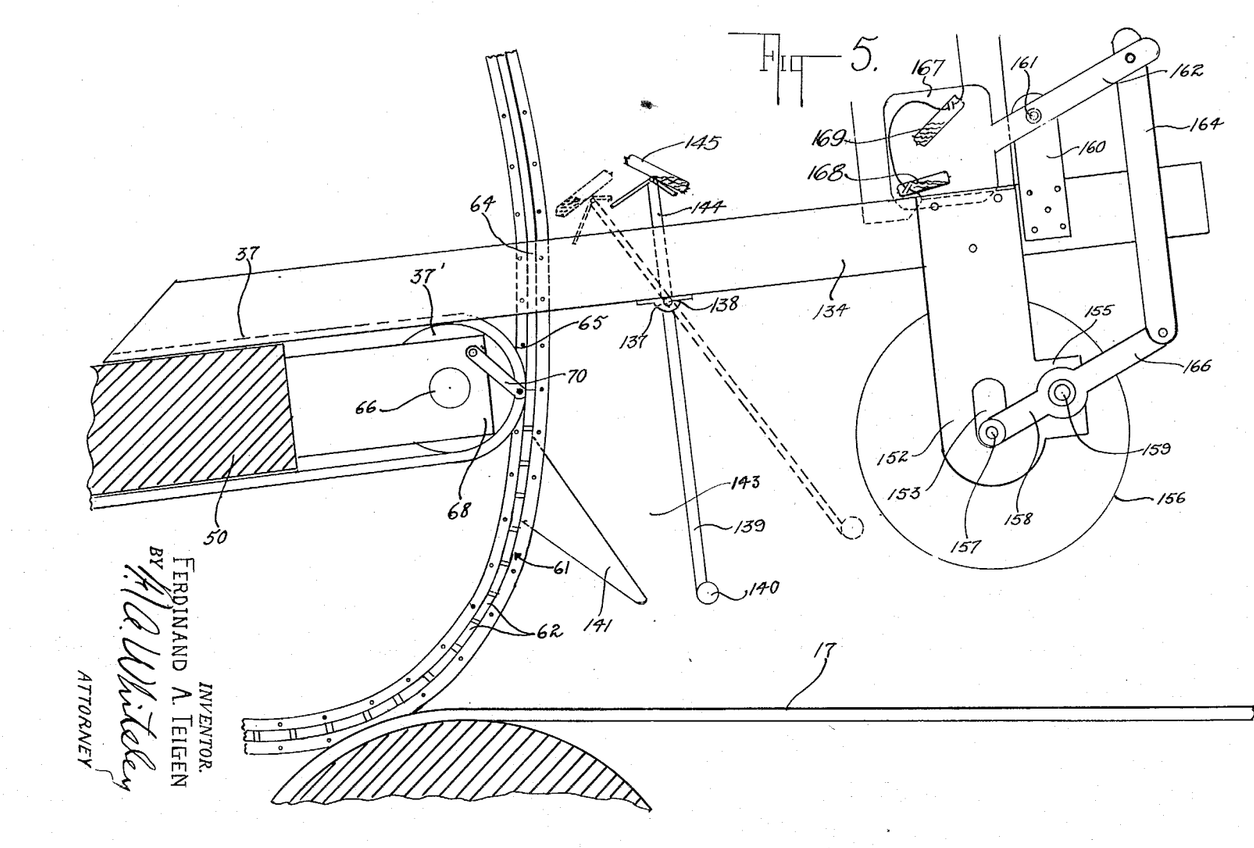
Fig. 5 is an enlarged transverse view of the means for controlling the electrical switches for effecting operations of the motors for lifting and lowering the front end of the fast-moving conveyor, taken in line 5—5 of Fig. 4.

The contact 146 on switch 145, hereinbefore referred to, includes wires 148 and 149 and the contact 147 includes wires 148 and 150. It will be apparent, as shown in Figs. 5 and 6, that when the plate 139 is hanging vertical or in any position less vertical than its maximum angular position, as shown in dotted lines in Figs. 5 and 6, the contact 146 is closed and the contact 147 is open, which constitute positions for maintaining broken the circuit that will operate the motor 81 to drop the feed conveyor 37.

Figure 6:
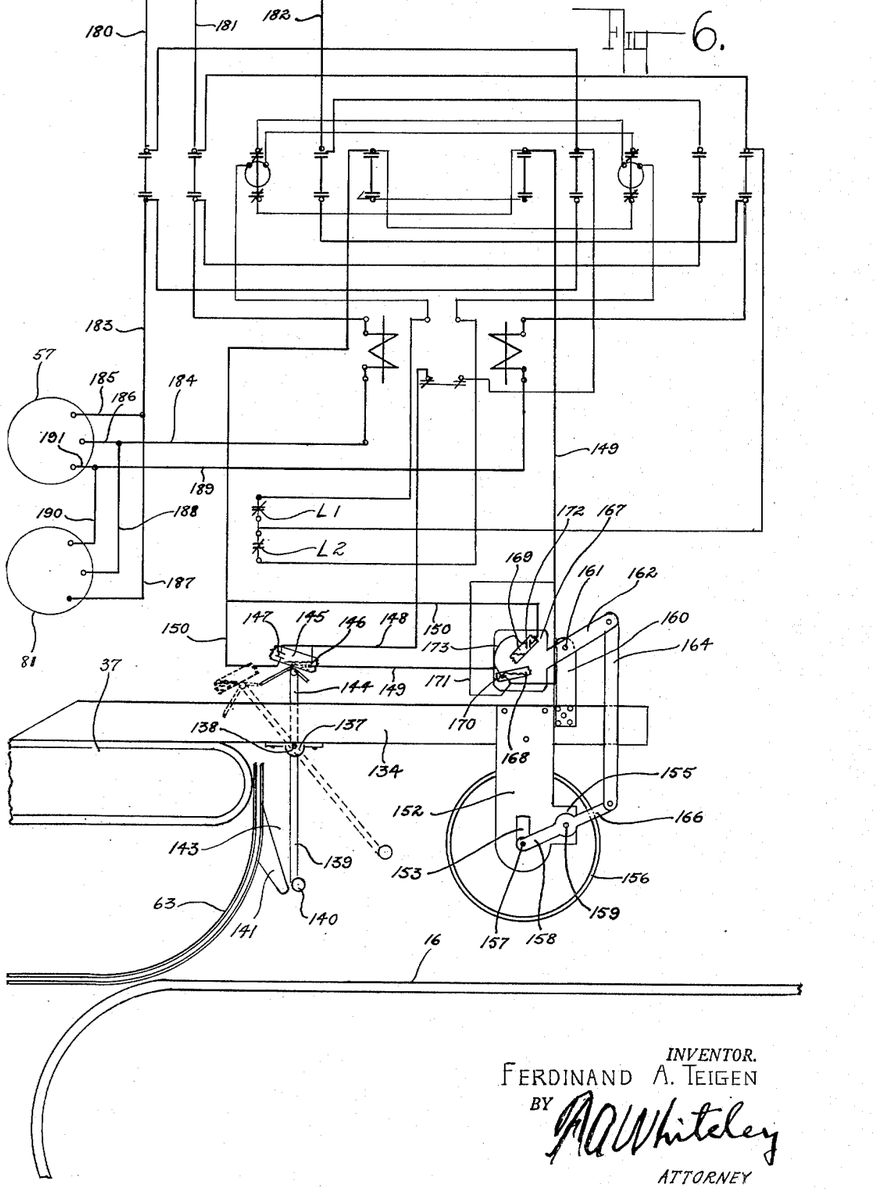
Fig. 6 is a wiring diagram showing the manner of closing the circuits for controlling the lifting and lowering of the elevating conveyor, the frame attached thereto and the flexible gate for closing the end of the trough.

When the plate 139 is swung to the dotted line position the mercury switch 145 will be moved so that contact 147 is closed, which will operate to lift the feed conveyor 37 and do so until it reaches its maximum elevated position, as shown in dotted lines in Figs. 1 and 6, when a limit switch L1 will disconnect the current and the feed conveyor will remain at its elevated position, until failure of feed of potatoes allows the plate 139 to start its return to its vertical position, which, in conjunction with switches 168 and 169, will effect operation of the motor 81 to lower the conveyor 37.

The circuits shown in the wiring diagram of Fig. 6 are such that at the time the lifting motor 57 is put in operation the lowering motor 81 is operated in reverse direction to the motor 57. Likewise when the lowering motor 81 is put in operation to lower the feed conveyor 37 and parts connected therewith the lifting motor 57 would be simultaneously operated in a direction in reverse to that of its lifting action.

When the lowering motor 81 is put into operation it will continue to lower the feed conveyor and connected parts until it reaches its final lowered position, at which time limit switch L2 will break the circuit and terminate operation of the lowering motor.

The operation of the lowering motor 81 is controlled by contact 146 in association with contacts 170 and 172. These latter contacts, as has been pointed out heretofore, are controlled by the position of the roller 156 operating upon and tending to level back the potatoes being fed to and under it. It follows that the lowering of the feed conveyor 37 is controlled conjointly by the position of the plate 139 and of the roller 156 while the raising of feed conveyor 37 may be entirely controlled by the position of plate 139.

The wiring diagram of Fig. 6 is a standard switch-operating diagram showing the means for controlling circuits running to the motors 57 and 81. These motors are reversible motors, and since both of them have driving connection with the oscillating conveyor and parts connected therewith, including the flexible gate 61, it will be obvious that when the motor 57 is operating to lift these parts the motor 81 must be operating in reverse direction, and likewise when motor 81 is operating to lower the parts, motor 57 must be operating in reverse direction.

The line wires 180, 181 and 182 are so arranged that when the appropriate switches are closed for making a circuit through wires 183 and 184 by branches 185 and 186 the motor 57 will be energized for direct or lifting operation, and through branch wires 187 and 188 the motor 81 will be energized for reverse operation. And when the circuits are closed through wires 184 and 189, the branch wires 183 and 190 will close the circuit to motor 81 for it to effect direct-action lowering of the conveyor feed parts, and through branch wires 183 and 191 the motor 57 will be energized in reverse to cooperate with that lowering action.

The advantages of my invention are substantial and important. By means of the method and apparatus herein described difficult preliminary work of preparing the potatoes for final washing is accomplished on a mass production basis not only with saving of expense both in actual cost of materials, power, and man-hours employed, but in removal of excrescencies and sterilization of the potato skins, but also without bruising or injury thereto.

Accomplishing the latter result is a very highly valuable feature of my invention which solves a problem of great difficulty, since the method and apparatus is adapted to process rapidly huge masses of potatoes, both in volume and weight, and the expense of so treating potatoes to be subsequently given the final washing operation and drying and the sacking, could not be justified except when there is substantially no injury to the potatoes which might result in loss or depreciation of any considerable quantities thereof.

Since in the practice of my process and the use of the apparatus which is employed for such practice there is necessarily from time to time great variation in the flow of potatoes to the processing trough, it is a particularly advantageous feature of my invention that at the receiving end of the potatoes coming into the processing trough means are provided to maintain continuing supporting lateral and underneath contact of the individual potatoes in the mass such as to prevent cascading and resulting bruising, either directly from the feed conveyor or rearwardly from complete cessation of feed while the forwarding means is in operation.

Numerous other advantages have been pointed out in the foregoing specification and need not be specifically re-enumerated here.

I claim:

1. A method of processing potatoes for washing, comprising transporting potatoes in a moving column from a receiving point to the entrance of a washing area, transferring the column to the washing area in such a manner as to establish a substantially contiguous contacting mass, progressively moving the mass away from the point of transfer at a rate which is substantially less than the rate of movement of the column to maintain continuity of the mass, and subjecting the moving mass to a washing operation.

2. A method of processing potatoes for washing, comprising transporting potatoes in a moving column from a receiving point to the entrance of a washing area, transferring the column to the washing area in such a manner as to establish a substantially contiguous contacting mass of potatoes in the washing area, progressively moving the mass away from the point of transfer at a rate which is substantially less than the rate of movement of the column, subjecting the moving mass to a substantially constant pressure adjacent the area of formation to cause the potatoes to effect equalization of the mass, controlling the line of transfer of the column to the mass in such a manner that the potatoes leaving the column enter the top of the mass, and subjecting the mass to a washing operation.

3. A method of processing potatoes for washing, comprising transporting potatoes in a moving column from a receiving point to the entrance of a washing area, transferring the column to the washing area in such a manner as to establish a substantially contiguous contacting mass of potatoes in the washing area, progressively moving the mass away from the point of transfer at a rate which is substantially less than the rate of movement of the column, subjecting the moving mass to a substantially constant pressure adjacent the area of formation to cause the potatoes to effect equalization of the mass, controlling the line of transfer of the column to the mass in such a manner that the potatoes leaving the column enter the top of the mass, subjecting the mass to a washing operation, and progressively reducing the mass to form a contiguous contacting stream of potatoes after the washing operation has been completed.

4. A method of processing potatoes for washing, comprising transporting potatoes in a moving column from a receiving point to the entrance of a washing area, transferring the column to the washing area in such a manner as to establish a substantially contiguous contacting mass of potatoes in the washing area, progressively moving the mass away from the point of transfer at a rate which is substantially less than the rate of movement of the column, subjecting the moving mass to a washing operation, discharging the moving mass after the same has been washed, and maintaining a continuing lateral support for the potatoes at all times to thereby prevent injury from cascading or precipitation.

5. A method of processing potatoes for washing, comprising transporting potatoes from a receiving point to a washing area in a moving column, forming the column into a moving mass of potatoes which moves through the washing area in continuity of the column but at a slower rate than the rate of movement of the column, moving the terminal end of the column in a vertical plane so that the column is delivered along the top of the mass of potatoes, controlling the vertical movement of the terminal end of the volumn in response to the depth of the mass adjacent its point of formation, and subjecting the moving mass to a progressive series of washing operations.

6. A method of processing potatoes for washing, comprising transporting potatoes in a limited volume from a receiving point to a washing area in a moving column, forming the moving column into a moving mass of potatoes which moves through the washing area in continuity of the rate of movement of the column but at a slower rate than the column, said mass of potatoes having a variable depth determined by the rate of delivery from the column, moving the terminal end of the column in a vertical plane so that the column is delivered in a line along the top of the mass of potatoes, controlling the vertical movement of the terminal end of the column in response to the depth of the mass adjacent its point of formation, subjecting the mass in an area adjacent its point of formation to a first spraying operation to remove dirt, subjecting the mass to a second spraying operation to sterilize the outer surfaces of the potatoes after the same has progressively moved beyond the area of the first spraying operation, subjecting the mass to a third spraying operation to remove residual amounts of the fluid forming the second spraying operation after the mass has moved beyond the area of the second spraying operation, discharging the potatoes from the mass when the same has moved beyond the area of the third spraying operation, and maintaining restraint upon the movement of the potatoes as they are discharged from the mass to hold the potatoes in continuous contact and thereby prevent dropping or cascading when the potatoes are discharged.

7. A method of processing potatoes for washing, comprising transporting potatoes from a receiving point to a washing area in a moving column, forming the column into a moving mass of potatoes which moves through a washing area in continuity of the column but at a slower rate than the rate of movement of the column, subjecting the potatoes in the mass to successive sprays of water, a liquid sterilizer and a neutralizing agent all spraying over different regions of the moving mass, discharging potatoes from the mass into a rapidly moving stream after the potatoes have completed movement through the several spraying operations, and maintaining restraint on the movement of the potatoes during the discharge operation so as to maintain them in continuous contact to prevent injury to the bodies or skins of the potatoes.

8. A method of processing potatoes for washing, comprising transporting potatoes from a receiving point to a washing area in a moving column, forming the column into a moving mass of potatoes which moves through the washing area in continuity of the column but at a slower rate than the rate of movement of the column, moving the terminal end of the column in a vertical plane so that the column is delivered along the top of the mass of potatoes, and subjecting the moving mass to a substantially continuous pressure in a direction which is in opposition to the moving mass to effect rearward movement of the potatoes when delivery from the column fails entirely to thereby maintain the potatoes within the mass in contiguous contact with each other to prevent rearward cascading of potatoes within the mass.

FERDINAND A. TEIGEN.

REFERENCES CITED

The following references are of record in the file of this patent:

UNITED STATES PATENTS

| Number | Name | Date |
|---|---|---|
| Re. 17,769 | Morris | Aug. 12, 1930 |
| 1,964,275 | Secondo | June 26, 1934 |
| 2,100,942 | Cutler | Nov. 30, 1937 |
| 2,406,992 | Butler | Sept. 3, 1946 |